US012659393B2

(12) United States Patent
Guo

(10) Patent No.: US 12,659,393 B2
(45) Date of Patent: Jun. 16, 2026

(54) ELECTRONIC DEVICE WITH SIDE SUPPORT BRACKET

(71) Applicant: HONOR DEVICE CO., LTD., Shenzhen (CN)

(72) Inventor: Renwei Guo, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 338 days.

(21) Appl. No.: 18/034,993

(22) PCT Filed: Apr. 18, 2022

(86) PCT No.: PCT/CN2022/087369
§ 371 (c)(1),
(2) Date: May 2, 2023

(87) PCT Pub. No.: WO2022/228178
PCT Pub. Date: Nov. 3, 2022

(65) Prior Publication Data
US 2023/0403350 A1 Dec. 14, 2023

(30) Foreign Application Priority Data

Apr. 29, 2021 (CN) .......................... 202110477490.4

(51) Int. Cl.
*H04M 1/02* (2006.01)
*H04M 1/18* (2006.01)
(52) U.S. Cl.
CPC ......... *H04M 1/0269* (2022.02); *H04M 1/185* (2013.01)

(58) Field of Classification Search
CPC .. H04M 1/0269; H04M 1/185; H04M 1/0295; H04M 1/0266; H04M 1/0268;
(Continued)

(56) References Cited

U.S. PATENT DOCUMENTS 8,797,721 B2 * 8/2014 Pakula .................. G06F 1/1626
361/679.01
10,285,289 B2 5/2019 Sun
(Continued)

FOREIGN PATENT DOCUMENTS

CN 105044957 A 11/2015
CN 106055027 A 10/2016
(Continued)

*Primary Examiner* — Imani N Hayman
*Assistant Examiner* — Ross Terry Mularski
(74) *Attorney, Agent, or Firm* — WOMBLE BOND DICKINSON (US) LLP

(57) ABSTRACT

This application provides an electronic device. The electronic device includes a display module and a bracket, where the display module includes a module body portion and a module side portion; the module side portion is connected to the module body portion and is bent relative to the module body portion, and the module side portion and the module body portion enclose an accommodating space; the bracket includes a bracket body portion, a bracket side portion, and a support portion; the bracket body portion is located inside the accommodating space and is close to the module body portion to support the module body portion; the bracket side portion is connected to the bracket body portion, forming an included angle with the bracket body portion. The solution of this application can reinforce a region with low structural strength of the display module, enhancing impact resistance of the region.

12 Claims, 4 Drawing Sheets

10

A-A

(58) Field of Classification Search
CPC ........ G06F 1/16; G06F 1/1613; G06F 1/1626;
G06F 1/1629; G06F 1/1637; G06F
1/1643; G06F 1/1652; G06F 1/1656;
H05K 5/00; H05K 5/0018
See application file for complete search history.

(56)                  References Cited

U.S. PATENT DOCUMENTS

| | | | |
|---|---|---|---|
| 10,324,493 B2 * | 6/2019 | Kwak | ................... G06F 1/1637 |
| 2017/0082784 A1 | 3/2017 | Niu | |
| 2022/0400169 A1 | 12/2022 | Zhou et al. | |

FOREIGN PATENT DOCUMENTS

| | | | |
|---|---|---|---|
| CN | 110572492 A | 12/2019 | |
| CN | 110662383 A | 1/2020 | |
| CN | 111417276 A | 7/2020 | |
| CN | 211702103 U | 10/2020 | |
| CN | 112116879 A | 12/2020 | |
| CN | 212064060 U | 12/2020 | |
| CN | 112261183 A | 1/2021 | |
| CN | 112562496 A | 3/2021 | |
| CN | 112700728 A | 4/2021 | |
| CN | 113923280 A | 1/2022 | |
| WO | 2017041481 A1 | 3/2017 | |
| WO | 2020035126 A1 | 2/2020 | |

* cited by examiner

ELECTRONIC DEVICE WITH SIDE SUPPORT BRACKET

CROSS-REFERENCE TO RELATED APPLICATIONS

This application is a national stage of International Application No. PCT/CN2022/087369, filed on Apr. 18, 2022, which claims priority to Chinese Patent Application No. 202110477490.4, filed on Apr. 29, 2021. The disclosures of both of the aforementioned applications are hereby incorporated by reference in their entireties.

TECHNICAL FIELD

This application relates to the field of terminal devices, and in particular, to an electronic device.

BACKGROUND

In a mobile phone with a curved screen, a curved screen module is carried on a middle frame. The middle frame can well support a flat region of the curved screen module. However, an existing middle frame cannot well fit with an arc region at the edge of the curved screen module. This results in insufficient support for the arc region, causing low structural strength and proneness to abnormal display such as broken bright spots and black spots when an impact is experienced.

SUMMARY

This application provides an electronic device, which can well support the edge region of a curved screen, enhance structural reliability of the edge region, and reduce risks of abnormal display in the edge region.

This application provides an electronic device. The electronic device includes a display module and a bracket, where the display module includes a module body portion and a module side portion; the module side portion is connected to the module body portion and is bent relative to the module body portion, and the module side portion and the module body portion enclose an accommodating space. The bracket includes a bracket body portion, a bracket side portion, and a support portion, where the bracket body portion is located inside the accommodating space and is close to the module body portion to support the module body portion. The bracket side portion is connected to the bracket body portion, forming an included angle with the bracket body portion, and is close to the module side portion. The support portion is fixed to the bracket side portion to support the module side portion.

In this application, the module side portion is an edge portion of the display module. The module side portion being bent relative to the module body portion may include: the module side portion itself being bent; or the module side portion itself being flat and forming an included angle (or referred to as a bent angle) with the module body portion. The bracket may be mounted in the accommodating space. The bracket body portion is all located inside the accommodating space; the bracket side portion may be at least partly located inside the accommodating space; and the support portion may all be located inside the accommodating space. The bracket body portion and the module body portion may be directly connected, or connected via an intermediate component, or spaced apart (that spacing may be small). The bracket body portion can support the module body portion, thereby enhancing impact resistance of the module body portion. The bracket side portion is close to the module side portion, with a gap left in between. The support portion is fixed to the bracket side portion. The support portion and the module side portion may be directly connected, or connected via an intermediate component, or spaced apart (that spacing may be small). The support portion can support the module side portion, thereby enhancing impact resistance of the module side portion. Therefore, this application can reinforce a region with low structural strength of the display module, enhance impact resistance, and reduce risks of abnormal display when an impact is experienced.

In an implementation, the support portion includes a support block, where the support block is fixed to a side of the bracket side portion facing the module side portion, and the support block supports the module side portion. The support block is located inside the gap between the bracket side portion and the module side portion. The support block and the module side portion may be directly connected, or connected via an intermediate component, or spaced apart (that spacing may be small). The support block may match the module side portion in shape, so as to more adequately support the module side portion. This implementation has simple design, high manufacturability, and reliable fitting of products.

In an implementation, the bracket side portion is provided with a limit through hole; the support portion includes a limit plate, and the support block is disposed on the limit plate, a boundary of the support block being confined within a boundary of the limit plate; the support block penetrates through the limit through hole to support the module side portion; and the limit plate is fixed to a surface of the module side portion facing away from the module side portion. The support block is fixed to the bracket side portion via the limit plate. Such design can implement detachable connection between the support portion and the bracket side portion and satisfy the need of design or manufacture of specific products.

In an implementation, a surface of the support portion facing the module side portion is covered with a buffer layer. The buffer layer may substantially fully cover the surface of the support portion facing the module side portion. For example, the buffer layer may substantially fully cover a surface of the support block facing the module side portion. The buffer layer may be made of a soft and easily deformable material capable of absorbing impact, for example, foam. The buffer layer can absorb impact and enhance impact resistance of the module side portion.

In an implementation, the module side portion is an arc plate structure, with an arch apex of the module side portion located outside the module body portion. Such design allows the display module to have a rounded exterior and a smooth hand feel and can also increase a visible area of the display module. More importantly, because an arc edge of the display module is more vulnerable to impact, the design of this application can greatly improve impact resistance of the arc edge of the display module.

In an implementation, the support portion is provided with an arc surface, and the arc surface faces the module side portion. The arc surface of the support portion may fit with an arc inner surface of the module side portion, so that the support portion can provide full support.

In an implementation, the bracket includes an exterior bearing portion, where the exterior bearing portion is connected to an end of the bracket side portion away from the bracket body portion, an included angle is formed between the exterior bearing portion and the bracket side portion, and the exterior bearing portion and the bracket body portion are located at two opposite sides of the bracket side portion, respectively; the exterior bearing portion is located outside the accommodating space; the exterior bearing portion is provided with a bearing plane; and an end of the module side portion away from the module body portion is provided with a side portion plane, where the side portion plane faces the bearing plane and is fixedly connected to the bearing plane. The exterior bearing portion and the bracket body portion are located on the two opposite sides of the bracket side portion, respectively. This "two opposite sides" may be referred to two opposite sides of the bracket side portion in a thickness direction. The exterior bearing portion may be used as an exposed exterior component of an electronic device. With the exterior bearing portion designed, the end of the module side portion can be supported, guaranteeing fitting reliability of the display module. In addition, compact and aesthetic exterior of the electronic device can also be guaranteed.

In an implementation, the module side portion is an arc plate structure, with an arch apex of the module side portion located outside the module body portion; the exterior bearing portion is provided with an exterior arc surface, where the exterior arc surface is connected to the bearing plane of the exterior bearing portion, facing away from the side portion plane of the module side portion; and smooth transition is present between the exterior arc surface and an outer surface of the module side portion facing away from the accommodating space. Such design can guarantee exterior consistency of the electronic device, improving experience in exterior look of a product.

In an implementation, the module side portion includes a first module side portion and a second module side portion, where the first module side portion and the second module side portion are connected to two opposite ends of the module body portion, respectively; both the first module side portion and the second module side portion are bent relative to the module body portion, and the first module side portion, the module body part, and the second module side portion enclose the accommodating space. The bracket side portion includes a first bracket side portion and a second bracket side portion, where the first bracket side portion and the second bracket side portion are connected to two opposite ends of the bracket body portion, respectively; the first bracket side portion and the second bracket side portion both form an included angle with the bracket body portion and are both located at a side of the bracket body portion facing away from the module body portion; and the first bracket side portion is close to the first module side portion, and the second bracket side portion is close to the second module side portion. The support portion includes a first support portion and a second support portion, where the first support portion is fixed to the first bracket side portion, and the first support portion supports the first module side portion; and the second support portion is fixed to the second bracket side portion, and the second support portion supports the second module side portion. Such design allows the display module to have a rounded exterior and a smooth hand feel and can also increase the visible area of the display module. More importantly, because the arc edge of the display module is more vulnerable to impact, the design of this application can greatly improve the impact resistance of the arc edge of the display module.

In an implementation, the bracket includes a first bearing platform and a second bearing platform, where the first bearing platform is disposed on a surface of the first bracket side portion facing the second bracket side portion, and the second bearing platform is disposed on a surface of the second bracket side portion facing the first bracket side portion. The electronic device includes a rear cover, where the rear cover is fixed to the first bearing platform and the second bearing platform; and the first bearing platform and the second bearing platform are located between the rear cover and the bracket body portion. With the bearing platforms designed, the rear cover can be reliably fitted with the bracket.

In an implementation, the electronic device includes an upper cover and a lower cover, where the upper cover and the lower cover are fixed to two opposite ends of the display module, respectively; the rear cover is located between the upper cover and the lower cover; and the upper cover, the rear cover, and the lower cover close the accommodating space. The two opposite ends of the display module refer to two opposite ends of a cylindrical display module in its axis direction. The design of this implementation allows the electronic device to have an integral, compact and simple exterior. In addition, the upper cover and the lower cover may also be displays, so as to increase a display area and expand functions of the electronic device.

In an implementation, the display module includes a curved cover plate and a curved screen which fit onto each other, where the curved screen is located between the curved cover plate and the bracket, and the curved cover plate and the curved screen both include a first bent region, a flat region, and a second bent region which are connected in sequence. The flat region of the curved cover plate and the flat region of the curved screen coincide to constitute the module body portion. The first bent region of the curved cover plate and the first bent region of the curved screen are located on a same side of the flat region, the first bent region of the curved cover plate exceeds the first bent region of the curved screen, and the first bent region of the curved cover plate and the first bent region of the curved screen constitute the first module side portion. The second bent region of the curved cover plate and the second bent region of the curved screen are located on a same side of the flat region, the second bent region of the curved cover plate exceeds the second bent region of the curved screen, and the second bent region of the curved cover plate and the second bent region of the curved screen constitute the second module side portion. This implementation can enhance impact resistance of a curved screen device.

In an implementation, both the first module side portion and the second module side portion are arc plate structures, with arch apexes of the first module side portion and the second module side portion located outside the module body portion; and bent angles of the first bent region and the second bent region of the curved cover plate range from 90° to 180°. Such design allows two sides of the display module to have a large-radian bent profile, which can create a full and expansive exterior effect, allowing the electronic device to provide better experience in exterior look and enhancing the holding feel of a user.

In an implementation, bent angles of the first bent region and the second bent region of the curved screen are greater than or equal to 90°. With such design, when a user looks to the front of the electronic device, pictures can be displayed on both sides of the display module without black borders, thereby improving visual experience of the user.

DESCRIPTION OF EMBODIMENTS

The following embodiments of this application provide an electronic device. The electronic device includes but is not limited to a mobile phone, a tablet computer, a wearable device (for example, a virtual display device, an augmented display device, or a smart watch), a smart screen device, a vehicle-mounted device (for example, a vehicle-mounted machine), a portable charger, an electronic reader, an outdoor display device, and the like. For example, the electronic device described below is a mobile phone.

Figure 1:
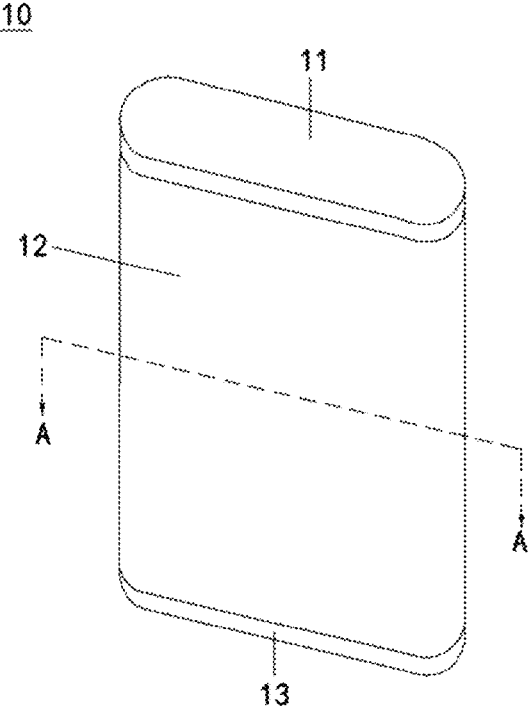
FIG. 1 is a schematic diagram of an assembly structure of an electronic device according to Embodiment 1.
Figure 2:
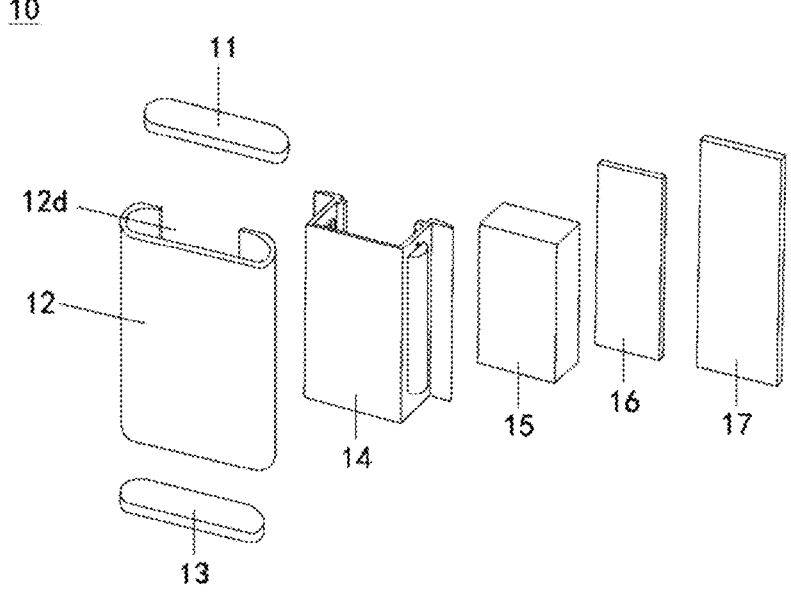
FIG. 2 is a schematic diagram of an exploded structure of the electronic device in FIG. 1.

As shown in FIG. 1 and FIG. 2, in Embodiment 1, an electronic device 10 may include an upper cover 11, a display module 12, a lower cover 13, a bracket 14, an electronic module 15, a cover plate 16, and a rear cover 17.

Figure 3:
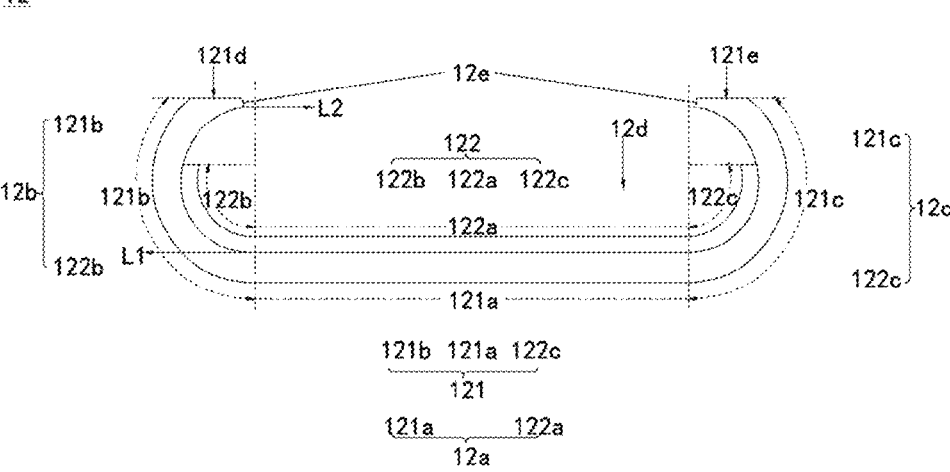
FIG. 3 is a schematic diagram of a lateral structure of a display module of the electronic device in FIG. 2.

The display module 12 is an electronic component configured to display images, which is exposed and can be seen directly by a user. The display module 12 may be a cylindrical structure with openings at two ends. As shown in FIG. 3, the display module 12 may be a curved screen module, which may include a curved cover plate 121 and a curved screen 122 that fit onto each other. As an outer structure of the electronic device 10, the curved cover plate 121 can be directly seen and touched by a user. The curved cover plate 121 can protect the curved screen 122. The curved screen 122 is located inside the electronic device 10 and cannot be directly seen or touched by the user.

As shown in FIG. 3, the curved cover plate 121 may include a first bent region 121b, a flat region 121a, and a second bent region 121c, where the flat region 121a is connected between the first bent region 121b and the second bent region 121c. The flat region 121a may be substantially a flat plate structure. The first bent region 121b and the second bent region 121c may be substantially the same in structure, which may both be bent plate structures, for example, arc plate structures. The first bent region 121b and the second bent region 121c may be bent and arched in directions leaving each other, respectively, which allows their arch apexes to be located outside the flat region 121a.

Such connection structure between the first bent region 121b and the flat region 121a may be referred to as the first bent region 121b being bent relative to the flat region 121a, that is, transition from the flat region 121a to the first bent region 121b. Similarly, such connection structure between the second bent region 121c and the flat region 121a may be referred to as the second bent region 121c being bent relative to the flat region 121a.

In Embodiment 1, bent angles of both the first bent region 121b and the second bent region 121c may range from 90° to 180° (inclusive of 90° and 180°). The bent angles of the first bent region 121b and the second bent region 121c may be substantially the same. As shown in FIG. 3, with the first bent region 121b as an example, the bent angle may be defined in the following manner: a tangent line L1 of the first bent region 121b is made at a joint position of the first bent region 121b and the flat region 121a, and a tangent line L2 of the first bent region 121b is made at an end of the first bent region 121b away from the flat region 121a, where both the tangent line L1 and the tangent line L2 are radial lines. With rotation from the tangent line L1 to the tangent line L2, an angle formed by the tangent line L1 and the tangent line L2 is referred to as a bent angle. The bent angle of the first bent region 121b shown in FIG. 3 may be approaching 180°.

In the above definition of the bent angle, both the tangent line L1 and the tangent line L2 taken are radial lines tangent to an inner surface of the first bent region 121b, for the purpose of calculating a maximum bent angle of the first bent region 121b. This maximum bent angle can represent a maximum bent degree of the first bent region 121b. If both the tangent line L1 and the tangent line L2 taken are radial lines tangent to an outer surface of the first bent region 121b, the bent angle calculated will be less than this maximum bent angle (this is because a side portion plane 121d is present in the first bent region 121b, so the outer surface and the inner surface of the first bent region 121b are not fully consistent but have unequal central angles, which will be described below.) It can be easily understood that if the outer surface and the inner surface of the first bent region 121b are fully consistent, that is, their corresponding central angles are substantially the same, no matter how the tangent line L1 and the tangent line L2 are taken, the calculated bent angle is constant.

In Embodiment 1, the bent angle of the first bent region 121b or the bent angle of the second bent region 121c is a bent angle of the whole display module 12. The bent angle of the display module 12 may range from 90° to 180°, so that two sides of the display module 12 have a large-radian bent profile. Such large-radian bent profile can create a full and expansive exterior effect, allowing the electronic device 10 to provide better experience in exterior look and enhancing the holding feel of a user.

In other embodiments, the bent angle of the first bent region 121b and the bent angle of the second bent region 121c may alternatively be unequal, so that two sides of the display module 12 may have different bent angles.

As shown in FIG. 3, the end of the first bent region 121b away from the flat region 121a is provided with a side portion plane 121d, where the side portion plane 121d may be substantially parallel to the flat region 121a, or the side portion plane 121d is substantially perpendicular to a thickness direction of the flat region 121a. With presence of the side portion plane 121d, the outer surface (facing away from a surface of the curved screen 122) and the inner surface (facing the surface of the curved screen 122) of the first bent region 121b are not fully consistent. The central angle of the outer surface is less than that of the inner surface. The side portion plane 121d is configured to fit with the bracket 14 (which will be described below). In other embodiments, there may be no side portion plane 121d provided. In this case, the outer surface and the inner surface of the first bent region 121b are substantially fully consistent, and their central angles are substantially the same.

As shown in FIG. 3, similarly, the end of the second bent region 121c away from the flat region 121a is provided with a side portion plane 121e. The side portion plane 121e may be substantially parallel to the flat region 121a, or the side portion plane 121e is substantially perpendicular to a thickness direction of the flat region 121a. With presence of the side portion plane 121e, the outer surface (facing away from a surface of the curved screen 122) and the inner surface (facing the surface of the curved screen 122) of the second bent region 121c are not fully consistent. The central angle of the outer surface is less than that of the inner surface. The side portion plane 121e is configured to fit with the bracket 14 (which will be described below). In other embodiments, there may be no side portion plane 121e provided. In this case, the outer surface and the inner surface of the second bent region 121c are substantially fully consistent, and their central angles are substantially the same.

The curved screen 122 may be formed by laminating a plurality of material layers, which includes a number of pixel units and is capable of displaying images. For example, the curved screen 122 may include an organic light-emitting diode display panel.

As shown in FIG. 3, the curved screen 122 may include a first bent region 122b, a flat region 122a, and a second bent region 122c, where the flat region 122a is connected between the first bent region 122b and the second bent region 122c. The flat region 122a may be substantially a flat plate structure. The first bent region 122b and the second bent region 122c may be substantially the same in structure, which may both be bent plate structures, for example, arc plate structures. The first bent region 122b and the second bent region 122c may be bent and arched in directions leaving each other, respectively, which allows their arch apexes to be located outside the flat region 122a.

As shown in FIG. 3, the flat region 122a of the curved screen 122 may substantially coincide with the flat region 121a of the curved cover plate 121. To be specific, a projection of the flat region 122a in the thickness direction of the flat region 121a substantially coincides with the flat region 121a. The first bent region 122b of the curved screen 122 is consistent with the first bent region 121b of the curved cover plate 121 in position. To be specific, the two first bent regions are located at a same side of the flat region 122a (or the flat region 121a). The second bent region 122c of the curved screen 122 is consistent with the second bent region 121c of the curved cover plate 121 in position. To be specific, the two second bent regions are located at a same side of the flat region 122a (or the flat region 121a).

As shown in FIG. 3, the first bent region 122b of the curved screen 122 is confined within the first bent region 121b of the curved cover plate 121, or the first bent region 121b exceeds the first bent region 122b. Similarly, the second bent region 122c of the curved screen 122 is confined within the second bent region 121c of the curved cover plate 121, or the second bent region 121c exceeds the second bent region 122c.

Similar to the foregoing description, the curved screen 122 may also be defined with a bent angle. As the first bent region 122b of the curved screen 122 may be shorter than the first bent region 121b of the curved cover plate 121, the bent angle of the first bent region 122b of the curved screen 122 may be less than that of the first bent region 121b of the curved cover plate 121. The bent angle of the first bent region 122b of the curved screen 122 may be greater than or equal to 90°. The bent angle of the second bent region 122c of the curved screen 122 and the bent angle of the first bent region 122b of the curved screen 122 may be substantially the same. Therefore, the display area of the display module 12 is enlarged, so that a screen-to-body ratio of the electronic device 10 is increased, thereby enhancing viewing experience of a user. In particular, the bent angle of the curved screen 122 may be greater than or equal to 90°. When a user looks to the front of the electronic device 10, pictures can be displayed on both sides of the display module 12 without black borders, thereby improving visual experience of the user. For example, a mobile phone including such display module 12 is a new form of mobile phone product, with a screen-to-body ratio being much greater that of a conventional mobile phone. When the user looks to the front of the mobile phone, black borders of pictures are not visible. This can greatly improve visual experience of the user.

As shown in FIG. 3, the flat region 122a of the curved screen 122 and the flat region 121a of the curved cover plate 121 may constitute a module body portion 12a of the display module 12. The first bent region 122b of the curved screen 122 and the first bent region 121b of the curved cover plate 121 may constitute a first module side portion 12b of the display module 12. The second bent region 122c of the curved screen 122 and the second bent region 121c of the curved cover plate 121 may constitute a second module side portion 12c of the display module 12. That is, the module body portion 12a is connected to the first module side portion 12b and the second module side portion 12c, and both the first module side portion 12b and the second module side portion 12c are bent relative to the module body portion 12a. The first module side portion 12b and the second module side portion 12c may both be referred to as a module side portion.

As shown in FIG. 3, the first module side portion 12b, the second module side portion 12c, and the module body portion 12a may enclose an accommodating space 12d. The first module side portion 12b and the second module side portion 12c are spaced oppositely to form an opening 12e of the accommodating space 12d. In Embodiment 1, the accommodating space 12d becomes narrower at the opening 12e. A caliber of the opening 12e is less than a size of a widest part of the accommodating space 12d (for example, from a viewing angle of FIG. 3, a distance between an arch apex of the first module side portion 12b and an arch apex of the second module side portion 12c is the size of the widest part of the accommodating space 12d).

In other embodiments, similar to Embodiment 1, a module side portion of a display module is bent relative to a module body portion. However, unlike Embodiment 1, the module side portion is flat, and a bent angle is formed by the module side portion and the module body portion of the display module. An electronic device with such display module may be used for, for example, outdoor displays.

Figure 4:
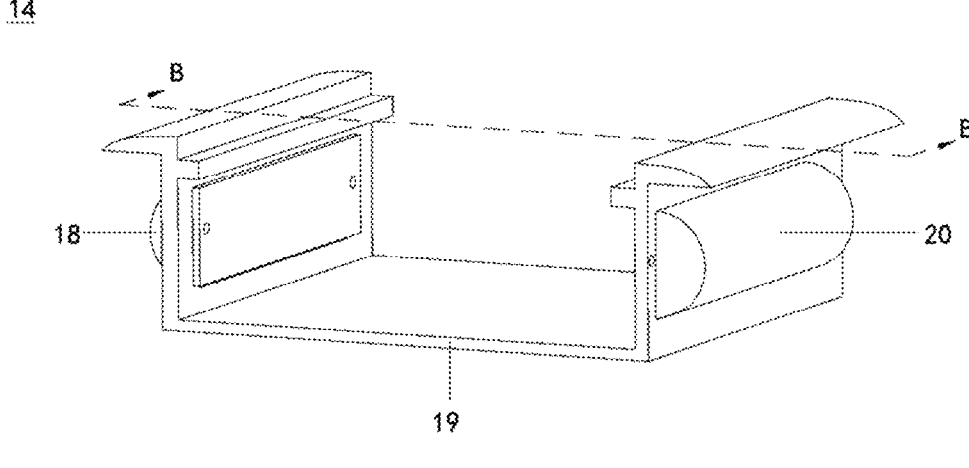
FIG. 4 is a schematic diagram of an assembly structure of a bracket of the electronic device in FIG. 2.

As shown in FIG. 4, the bracket 14 may include a bracket body 19 and a first support portion 18 and a second support portion 20 that are fixed to the bracket body 19. This will be described below separately.

Figure 5:
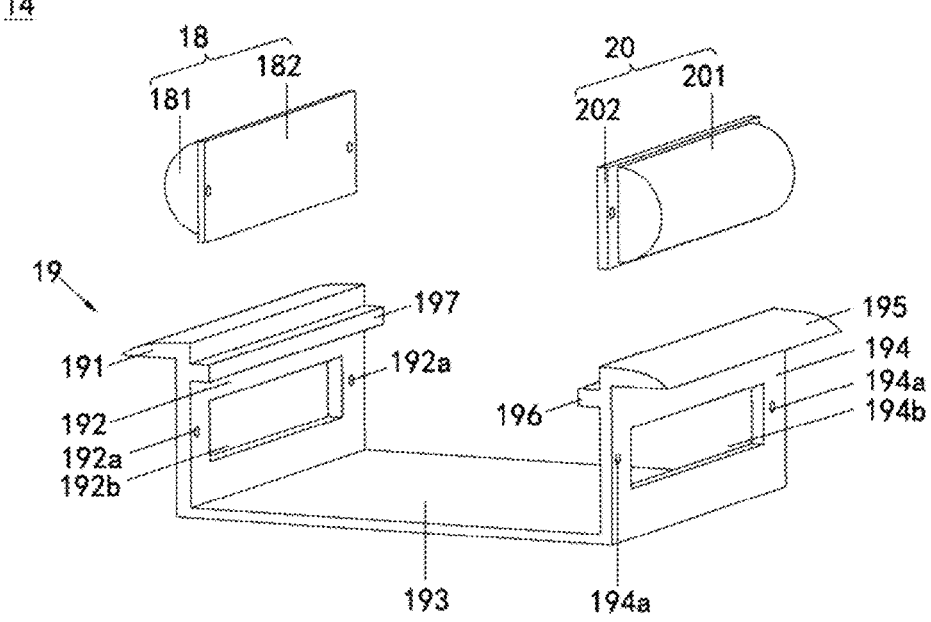
FIG. 5 is a schematic diagram of an exploded structure of the bracket in FIG. 4.

As shown in FIG. 4 and FIG. 5, the bracket body 19 as a whole may be approximately in a C shape. The bracket body 19 may include a first exterior bearing portion 191, a first bracket side portion 192, a bracket body portion 193, a second bracket side portion 194, and a second exterior bearing portion 195. All these portions of the bracket body 19 may be approximately plate-shaped and are connected in sequence.

The first bracket side portion 192 and the second bracket side portion 194 are connected to two opposite ends of the bracket body portion 193, respectively; and the first bracket side portion 192 and the second bracket side portion 194 are located at a same side of the bracket body portion 193 in a thickness direction. Both the first bracket side portion 192 and the second bracket side portion 194 are connected to the bracket body portion 193 in a bent form, for example, with a bent angle being approximately 90°. The first bracket side portion 192 and the second bracket side portion 194 may be substantially the same in structure, for example, both being plate-shaped. The first bracket side portion 192 and the second bracket side portion 194 may both be referred to as a bracket side portion.

As shown in FIG. 5, the first bracket side portion 192 may be provided with a first limit through hole 192*b*, where the first limit through hole 192*b* may be a rectangular through hole penetrating through the first bracket side portion 192 in a thickness direction of the first bracket side portion 192. The first bracket side portion 192 may also be provided with a first connection through hole 192*a*. For example, two first connection through holes 192*a* may be provided and located at two opposite sides of the first limit through hole 192*b*, respectively.

As shown in FIG. 5, similarly, the second bracket side portion 194 may be provided with a second limit through hole 194*b*, where the second limit through hole 194*b* may be a rectangular through hole penetrating through the second bracket side portion 194 in a thickness direction of the second bracket side portion 194. The second bracket side portion 194 may also be provided with a second connection through hole 194*a*. For example, two second connection through holes 194*a* may be provided and located at two opposite sides of the second limit through hole 194*b*, respectively.

As shown in FIG. 5, a first bearing platform 197 may be disposed in a protruding manner on a surface of the first bracket side portion 192 facing the second bracket side portion 194, and the first bearing platform 197 may be away from the bracket body portion 193. The first bearing platform 197 may be substantially shaped into a rectangular prism. Similarly, a second bearing platform 196 may be disposed on a surface of the second bracket side portion 194 facing the first bracket side portion 192 in a protruding manner, and the second bearing platform 196 may be away from the bracket body portion 193. The second bearing platform 196 may be substantially shaped into a rectangular prism. A distance from the second bearing platform 196 to the bracket body portion 193 and a distance from the first bearing platform 197 to the bracket body portion 193 may be substantially the same.

As shown in FIG. 5, the first exterior bearing portion 191 is connected to an end of the first bracket side portion 192 away from the bracket body portion 193. The first exterior bearing portion 191 is connected to the first bracket side portion 192 in a bent form, for example, with a bent angle being approximately 90°. In addition, the first exterior bearing portion 191 and the first bearing platform 197 are located at two sides of the first bracket side portion 192 in a thickness direction, respectively.

Figure 6:
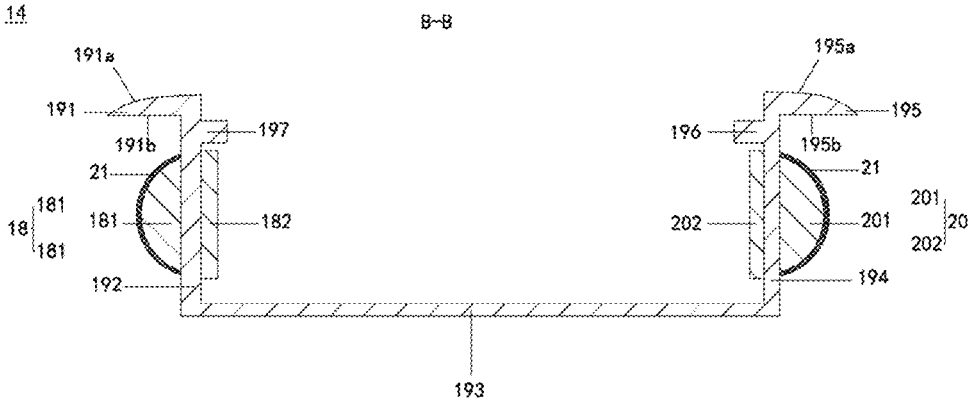
FIG. 6 is a schematic structural diagram of a cross section of the bracket in FIG. 4 along B-B.

FIG. 6 is a cross-sectional view of an assembly structure of the bracket 19, the first support portion 18, and the second support portion 20. As shown in FIG. 5 and FIG. 6, the first exterior bearing portion 191 may be an arc angular structure. An exterior arc surface 191*a* and a bearing plane 191*b* that are connected may be provided on the first exterior bearing portion 191 and are joined on a side away from the first bracket side portion 192 to form a sharp corner. The exterior arc surface 191*a* may be bent towards the bearing plane 191*b*, and the bearing plane 191*b* may be substantially parallel to the bracket body portion 193.

The second exterior bearing portion 195 and the first exterior bearing portion 191 may be substantially the same in structure and are symmetrically distributed. Specifically, as shown in FIG. 5 and FIG. 6, the second exterior bearing portion 195 is connected to an end of the second bracket side portion 194 away from the bracket body portion 193. The second exterior bearing portion 195 is connected to the second bracket side portion 194 in a bent form, for example, with a bent angle being approximately 90°. In addition, the second exterior bearing portion 195 and the second bearing platform 196 are located at two sides of the second bracket side portion 194 in a thickness direction. The second exterior bearing portion 195 may be an arc angular structure. An exterior arc surface 195*a* and a bearing plane 195*b* that are connected may be provided on the second exterior bearing portion 195 and are joined on a side away from the second bracket side portion 194 to form a sharp corner. The exterior arc surface 195*a* may be bent towards the bearing plane 195*b*, and the bearing plane 195*b* may be substantially parallel to the bracket body portion 193.

As shown in FIG. 5, the first support portion 18 may include a first limit plate 182 and a first support block 181 disposed on the first limit plate 182. The first limit plate 182 may be approximately a flat plate. The first support block 181 may be approximately part of a cylinder, for example, a semi-cylinder. Alternatively, the first support block 181 may be in other shapes having an arc surface. A boundary of the first support block 181 may be confined within a boundary of the first limit plate 182. To be specific, an orthographic projection of the first support block 181 on the first limit plate 182 falls within the boundary of the first limit plate 182. The first support block 181 is configured to support the first module side portion 12*b* of the display module 12 (which will be further described below).

As shown in FIG. 5, the second support portion 20 and the first support portion 18 are substantially the same in structure and are symmetrically distributed. Specifically, the second support portion 20 may include a second limit plate 202 and a second support block 201 disposed on the second limit plate 202. The second limit plate 202 may be approximately a flat plate. The second support block 201 may be approximately part of a cylinder, for example, a semi-cylinder. Alternatively, the second support block 201 may be in other shapes having an arc surface. A boundary of the second support block 201 may be confined within a boundary of the second limit plate 202. To be specific, an orthographic projection of the second support block 201 on the second limit plate 202 falls within the boundary of the second limit plate 202. The second support block 201 is configured to support the second module side portion 12*c* of the display module 12 (which will be further described below).

In Embodiment 1, the second support block 201 and the first support block 181 may both be referred to as a support block. The support block is configured to support the module side portion of the display module 12. In other embodiments, when the module side portion of the display module is flat, the support block may match the module side portion in shape, for example, a surface of the support block facing the module side portion being substantially planar.

As shown in FIG. 6, arc cylindrical surfaces of both the first support block 181 and the second support block 201 may be covered with a buffer layer 21, and the buffer layer 21 substantially fully covers the arc cylindrical surface. The buffer layer 21 may be made of a soft and easily deformable material capable of absorbing impact, for example, foam.

As shown in FIG. 5 and FIG. 6, the first support block 181 of the first support portion 18 may penetrate through the first limit through hole 192*b* in the first bracket side portion 192. The first limit plate 182 of the first support portion 18 may fit with the surface of the first bracket side portion 192. Therefore, the first support portion 18 is limited to being located on the first bracket side portion 192. To fix the first support portion 18, the first limit plate 182 and the first bracket side portion 192 may be fixed by using a connecting element (for example, a connecting screw or a rivet), where the connecting element penetrates through the first limit plate 182 and the first connection through hole 192a in the first bracket side portion 192.

As shown in FIG. 5 and FIG. 6, the second support block 201 of the second support portion 20 may penetrate through the second limit through hole 194b in the second bracket side portion 194. The second limit plate 202 of the second support portion 20 may fit with the surface of the second bracket side portion 194. Therefore, the second support portion 20 is limited on the second bracket side portion 194. To fix the second support portion 20, the second limit plate 202 and the second bracket side portion 194 may be fixed by using a connecting element (for example, a connecting screw or a rivet), where the connecting element penetrates through the second limit plate 202 and the second connection through hole 194a in the second bracket side portion 194.

As shown in FIG. 6, the second limit plate 202 in the second support portion 20 and the first limit plate 182 in the first support portion 18 are face to face with each other. The second support block 201 in the second support portion 20 and the first support block 181 in the first support portion 18 are back to back with each other. In addition, both the second limit plate 202 and the first limit plate 182 may be lower than the first bearing platform 197 (or the second bearing platform 196). To be specific, both the second limit plate 202 and the first limit plate 182 may be located between the first bearing platform 197 (or the second bearing platform 196) and the bracket body portion 193. Both the second support block 201 and the first support block 181 may be lower than the first exterior bearing portion 191 (or the second exterior bearing portion 195). To be specific, both the second support block 201 and the first support block 181 may be located between the first exterior bearing portion 191 (or the second exterior bearing portion 195) and the bracket body portion 193.

Figure 7:
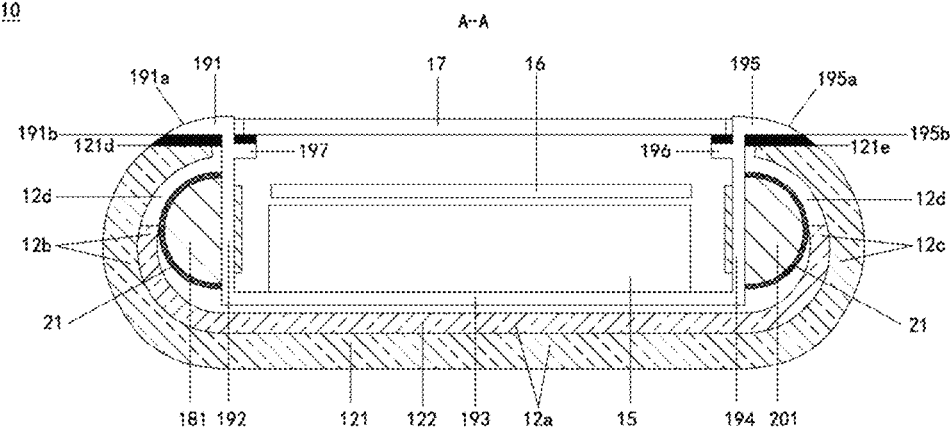
FIG. 7 is a schematic structural diagram of a cross section of the electronic device in FIG. 1 along A-A.

FIG. 7 may represent a fitting relationship between the display module 12 and the bracket 14. To keep diagram clean, only some parts are represented in a cross-sectional view. As shown in FIG. 3, FIG. 6, and FIG. 7, the display module 12 may be mounted on the bracket 14, and most of the bracket 14 may be located inside the accommodating space 12d.

Specifically, the bracket body portion 193 of the bracket 14 is located inside the accommodating space 12d. The bracket body portion 193 may be close to the module body portion 12a of the display module 12 (or be close to the curved screen 122 of the display module 12). No gap or some gap is present between the bracket body portion 193 and the module body portion 12a. The bracket body portion 193 can support the module body portion 12a. The first bracket side portion 192 and the second bracket side portion 194 of the bracket 14 are substantially fully located inside the accommodating space 12d. Both the first bracket side portion 192 and the second bracket side portion 194 are located at a side of the bracket body portion 193 facing away from the module body portion 12a. The first bracket side portion 192 is close to the first module side portion 12b of the display module 12. The second bracket side portion 194 is close to the second module side portion 12c of the display module 12.

The first support block 181 on the first bracket side portion 192 is located inside the accommodating space 12d and is located between the first module side portion 12b and the first bracket side portion 192. The arc surface of the first support block 181 faces the first module side portion 12b. The first support block 181 can support the first module side portion 12b. For example, the buffer layer 21 on the first support block 181 may be in contact with the curved screen 122 and/or the curved cover plate 121 in the first module side portion 12b (contact fit shown in FIG. 7 is merely an illustration), so as to flexibly support the bent first module side portion 12b. Alternatively, according to the need of a product, a small gap may be present between the buffer layer 21 on the first support block 181 and the curved screen 122 and/or the curved cover plate 121, so as to flexibly support the bent first module side portion 12b.

The second support block 201 on the second bracket side portion 194 is located inside the accommodating space 12d and is located between the second module side portion 12c and the second bracket side portion 194. The arc surface of the second support block 201 faces the second module side portion 12c. The second support block 201 can support the second module side portion 12c. For example, the buffer layer 21 on the second support block 201 may be in contact with the curved screen 122 and/or the curved cover plate 121 in the second module side portion 12c (contact fit shown in FIG. 7 is merely an illustration), so as to flexibly support the second module side portion 12c. Alternatively, according to the need of a product, a small gap may be present between the buffer layer 21 on the second support block 201 and the curved screen 122 and/or the curved cover plate 121, so as to flexibly support the bent second module side portion 12c.

In Embodiment 1, the bracket 14 is designed and the first support portion 18 is mounted on the first bracket side portion 192 of the bracket 14, so that the first support block 181 of the first support portion 18 fits with the first module side portion 12b to support the first module side portion 12b. The second support portion 20 is mounted on the second bracket side portion 194 of the bracket 14, so that the second support block 201 of the second support portion 20 fits with the second module side portion 12c to support the second module side portion 12c, thereby reinforcing a region with low structural strength of the display module 12, enhancing impact resistance, and reducing risks of abnormal display when an impact is experienced. In addition, the first support block 181 matches the first module side portion 12b in shape, and the second support block 201 matches the second module side portion 12c in shape. This can enhance fitting strength of the support block with the module side portion and enhance the structural strength of the module side portion.

In addition, both the first support block 181 and the second support block 201 are covered with the buffer layer 21. The buffer layer 21 is soft and can absorb impact, thereby avoiding damage to the module side portion. The first support block 181 and the first bracket side portion 192 are connected as an assembly, and the second support block 201 and the second bracket side portion 194 are connected as an assembly. Such split design can ensure manufacturability of the bracket 14. For example, different materials and processes may be used for processing the bracket body portion 19, the first support portion 18, and the second support portion 20 separately.

In Embodiment 1, when the display module 12 and the bracket 14 are fitted to an assembly, the bracket 14 may be inserted into the accommodating space 12d like a drawer from one end of the display module 12. Such assembling manner can adapt to the large-radian bent profile of the display module 12 and easily and reliably fit the display module 12 with the bracket 14.

In other embodiments, according to the need of a product, the first support portion may include a first support block without the first limit plate. The second support portion may include a second support block without the second limit plate. Both the first support portion and the second support portion may be connected to the bracket body 19 to form an assembly or be connected to the bracket body 19 as an integral piece.

As shown in FIG. 3, FIG. 6, and FIG. 7, both the first exterior bearing portion 191 and the second exterior bearing portion 195 may be located outside the accommodating space 12d of the display module 12. The bearing plane 191b on the first exterior bearing portion 191 may be connected to the side portion plane 121d of the curved cover plate 121, for example, glued with an adhesive (which is represented by a black block in FIG. 7). The exterior arc surface 191a on the first exterior bearing portion 191 may substantially smoothly transit to the outer surface of the first bent region 121b of the curved cover plate 121. The bearing plane 195b on the second exterior bearing portion 195 may be connected to the side portion plane 121e of the curved cover plate 121, for example, glued with an adhesive. The exterior arc surface 195a on the second exterior bearing portion 195 may substantially smoothly transit to the outer surface of the second bent region 121c of the curved cover plate 121. Such design enables the bracket 14 to well fix and support the display module 12 and can also guarantee the smoothness and aesthetics of the exterior of the electronic device 12. For example, a mobile phone with such fit design of the bracket 14 and the display module 12 is a new form of mobile phone product which can provide novel user experience.

As shown in FIG. 7, the electronic module 15 may be mounted on a side of the bracket body portion 193 facing away from the curved screen 122. For example, the electronic module 15 may be a circuit board assembly or a battery or certainly may be other components with electrical properties, which is not limited in Embodiment 1. The cover plate 16 may be located at a side of the electronic module 15 facing away from the bracket body portion 193. To be specific, from the viewing angle of FIG. 7, the cover plate 16 may be located above the electronic module 15. The cover plate 16 may have corresponding functions, for example, limiting the position of and providing electromagnetic protection for the electronic module 15.

As shown in FIG. 7, the rear cover 17 may be fixed to the first bearing platform 197 and the second bearing platform 196. The rear cover 17 may be substantially flush with the first exterior bearing portion 191 and the second exterior bearing portion 195. Therefore, the first exterior bearing portion 191, the rear cover 17, and the second exterior bearing portion 195 may jointly constitute a back structure of the electronic device 10.

In Embodiment 1, the rear cover 17 may be a mechanical component providing packaging and protection. Alternatively, the rear cover 17 may be a display module with a display function, so that both the front and rear sides of the electronic device 10 can provide display, thereby greatly increasing the display area of the electronic device 10. For example, a mobile phone with such design is a new form of mobile phone product and can provide a larger display area, which greatly improves user experience.

As shown in FIG. 1 and FIG. 2, both the upper cover 11 and the lower cover 13 may be flat plate structures. The upper cover 11 and the lower cover 13 are fixed to two opposite ends of the display module 12 respectively to close the two ends of the display module 12. The upper cover 11 and the lower cover 13 may be substantially parallel to each other. The rear cover 17 is located between the upper cover 11 and the lower cover 13. Thickness directions of the upper cover 11 and the lower cover 13 may be substantially perpendicular to a thickness direction of the rear cover 17. The upper cover 11, the rear cover 17, and the lower cover 13 close the accommodating space 12d of the display module 12.

In Embodiment 1, the upper cover 11 and the lower cover 13 may be a mechanical component providing packaging and protection. Alternatively, the upper cover 11 and/or the lower cover 13 may be a display module with a display function. This can further increase the display area of the electronic device 10. For example, a mobile phone with such design is a new form of mobile phone product and can provide a larger display area, which greatly improves user experience.

The above are only specific implementations of this application and not intended to limit the protection scope of this application. Any variations or replacements apparent to those skilled in the art within the technical scope disclosed by this application shall fall within the protection scope of this application. Therefore, the protection scope of this application shall be subject to the protection scope of the claims.

What is claimed is:

1. An electronic device, comprising:

a display module and a bracket, wherein the display module comprises a module body portion and a module side portion, wherein the module side portion is connected to the module body portion and is bent relative to the module body portion, and the module side portion and the module body portion enclose an accommodating space; and the bracket comprises a bracket body portion, a bracket side portion, and a support portion, wherein the bracket body portion is located inside the accommodating space and is close to the module body portion to support the module body portion, the bracket side portion is connected to the bracket body portion, forming an included angle with the bracket body portion, and is close to the module side portion, the bracket side portion is provided with a limit through hole; the support portion comprises a support block and a limit plate, the limit plate comprises a plate shape and is fixed to a surface of the module side portion facing away from the module side portion, the support block is disposed on the limit plate such that a projection of the support block on the limit plate results in a boundary of the support block being entirely confined within a boundary of the limit plate, the support block penetrates through the limit through hole to support the module side portion, and wherein a surface of the support portion facing the module side portion is covered with a buffer layer, the buffer layer comprising a deformable material that is impact absorbing, and wherein the bracket further comprises a bearing portion which is located at an end of the bracket side portion that is away from the bracket body portion, and the exterior bearing portion comprises an exterior arc surface, wherein a smooth transition is formed between the exterior arc surface and an outer surface of the module side portion facing away from the accommodating space.

2. The electronic device according to claim 1, wherein the buffer layer comprises a foam.

3. The electronic device according to claim 1, wherein the module side portion is an arc plate structure, with an arch apex of the module side portion located outside the module body portion.

4. The electronic device according to claim 1, wherein the support portion is provided with an arc surface, and the arc surface faces the module side portion.

5. The electronic device according to claim 1, wherein an included angle is formed between the exterior bearing portion and the bracket side portion, and the exterior bearing portion and the bracket body portion are located at two opposite sides of the bracket side portion, respectively; the exterior bearing portion is located outside the accommodating space, and the exterior bearing portion is provided with a bearing plane; and an end of the module side portion away from the module body portion is provided with a side portion plane, wherein the side portion plane faces the bearing plane and is fixedly connected to the bearing plane.

6. The electronic device according to claim 5, wherein the module side portion is an arc plate structure, with an arch apex of the module side portion located outside the module body portion; and wherein the exterior arc surface is connected to the bearing plane of the exterior bearing portion, facing away from the side portion plane of the module side portion.

7. The electronic device according to claim 1, wherein the module side portion comprises a first module side portion and a second module side portion, wherein the first module side portion and the second module side portion are connected to two opposite ends of the module body portion, respectively, both the first module side portion and the second module side portion are bent relative to the module body portion, and the first module side portion, the module body portion, and the second module side portion enclose the accommodating space;

the bracket side portion comprises a first bracket side portion and a second bracket side portion, wherein the first bracket side portion and the second bracket side portion are connected to two opposite ends of the bracket body portion, respectively, the first bracket side portion and the second bracket side portion both form an included angle with the bracket body portion and are both located at a side of the bracket body portion facing away from the module body portion, the first bracket side portion is close to the first module side portion, and the second bracket side portion is close to the second module side portion;

the support portion comprises a first support portion and a second support portion, wherein the first support portion is fixed to the first bracket side portion, and the first support portion supports the first module side portion; and the second support portion is fixed to the second bracket side portion, and the second support portion supports the second module side portion.

8. The electronic device according to claim 7, wherein the bracket comprises a first bearing platform and a second bearing platform, wherein the first bearing platform is disposed on a surface of the first bracket side portion facing the second bracket side portion, and the second bearing platform is disposed on a surface of the second bracket side portion facing the first bracket side portion; and the electronic device comprises a rear cover, wherein the rear cover is fixed to the first bearing platform and the second bearing platform, and the first bearing platform and the second bearing platform are located between the rear cover and the bracket body portion.

9. The electronic device according to claim 8, wherein the electronic device comprises an upper cover and a lower cover, wherein the upper cover and the lower cover are fixed to two opposite ends of the display module, respectively; the rear cover is located between the upper cover and the lower cover; and the upper cover, the rear cover, and the lower cover close the accommodating space.

10. The electronic device according to claim 7, wherein the display module comprises a curved cover plate and a curved screen which fit with each other, wherein the curved screen is located between the curved cover plate and the bracket, and the curved cover plate and the curved screen both comprise a first bent region, a flat region, and a second bent region which are connected in sequence;

the flat region of the curved cover plate and the flat region of the curved screen coincide to constitute the module body portion;

the first bent region of the curved cover plate and the first bent region of the curved screen are located on a same side of the flat region, the first bent region of the curved cover plate exceeds the first bent region of the curved screen, and the first bent region of the curved cover plate and the first bent region of the curved screen constitute the first module side portion; and the second bent region of the curved cover plate and the second bent region of the curved screen are located on a same side of the flat region, the second bent region of the curved cover plate exceeds the second bent region of the curved screen, and the second bent region of the curved cover plate and the second bent region of the curved screen constitute the second module side portion.

11. The electronic device according to claim 10, wherein both the first module side portion and the second module side portion are arc plate structures, with arch apexes of the first module side portion and the second module side portion located outside the module body portion; and bent angles of the first bent region and the second bent region of the curved cover plate range from 90° to 180°.

12. The electronic device according to claim 11, wherein bent angles of the first bent region and the second bent region of the curved screen are greater than or equal to 90°.

* * * * *